July 23, 1957  F. L. WEBB ET AL  2,800,409
EGG FILLING PROCESS AND THE RESULTING PRODUCT
Filed Feb. 21, 1955  2 Sheets-Sheet 1

INVENTORS
FLOYD L. WEBB
RENE CONRAD
BY Alexander Riaboff
ATTORNEY

July 23, 1957 F. L. WEBB ET AL 2,800,409
EGG FILLING PROCESS AND THE RESULTING PRODUCT
Filed Feb. 21, 1955 2 Sheets-Sheet 2

INVENTORS
FLOYD L. WEBB
RENE CONRAD
BY *Alexander Riaboff*
ATTORNEY

2,800,409

EGG FILLING PROCESS AND THE RESULTING PRODUCT

Floyd L. Webb, San Francisco, and René A. Conrad, Richmond, Calif.

Application February 21, 1955, Serial No. 489,417

7 Claims. (Cl. 99—138)

This invention relates to an egg filling process.

The primary object of this invention is to provide a method wherein an egg shell may be refilled with chocolate or other confectionary.

Another object of this process is to apply solution of gum-arabic and ethyl alcohol on the inner surface of the egg shell for the purpose of sealing the pores of the same and thus preserving the contents of the refilled egg for a longer period of time.

Another object of this process is to apply said solution on the inner surface of the egg shell to make peeling off the egg shell easier and to provide a glossy surface for the chocolate egg inside thereof.

Other objects and advantages will appear as the specification proceeds and the novel features of the device will be particularly pointed out in the claims hereto annexed.

In this specification and the annexed drawing, the invention is illustrated in the form considered to be the best but it is understood that the invention is not limited to such form; and it is also to be understood that in and by the claims following the description, it is desired to cover the invention in whatsoever form it may be embodied.

Our process is illustrated in the accompanying drawings in which.

The process comprising the subject matter of this invention consists of the following steps:

First, an egg 1 is drilled, as indicated at 2 and 3, at both ends. Various means may be used for this purpose, such as shows in our copending application, dated February 11, 1955, filed by us with the United States Patent Office.

Figure 1:
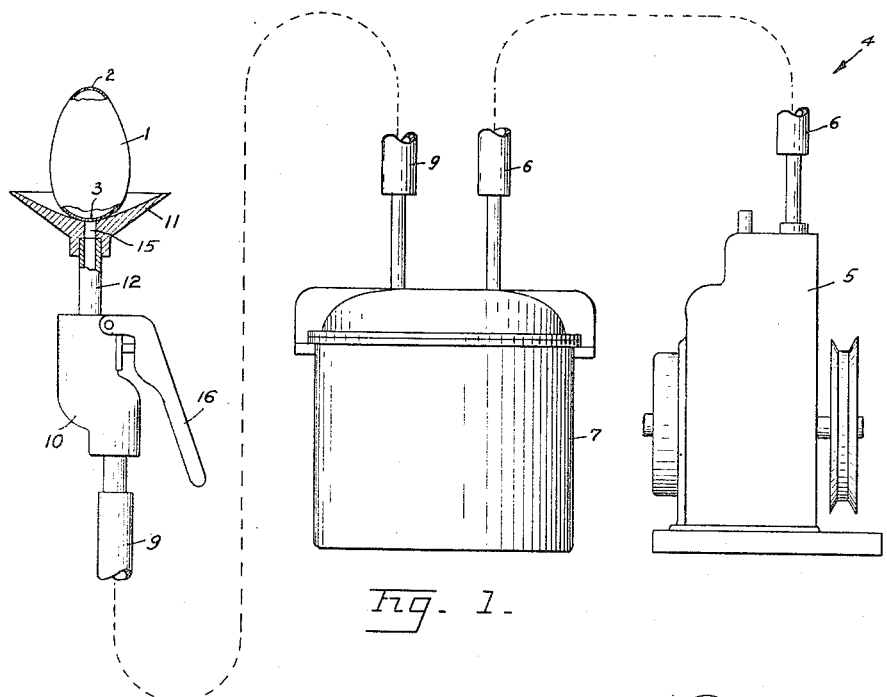
Fig. 1 shows a drilled egg being emptied of its contents.

Thereafter the contents of the egg 1 are extracted. For that purpose a device 4, shown in Fig. 1, may be used. The latter device comprises a vacuum pump 5 which is connected by means of a pipe 6 with a container 7. The latter is connected by means of a pipe 9 with a valve 10 carrying a suction cup 11 preferably made of rubber, communicating with said valve through a pipe 12.

A drilled egg 1 is placed on the suction cup 11 so that one of its holes is over the passage 15 in said cup. The valve handle 16 is pressed, thus connecting the passage 15 with the container 7. The vacuum in the latter container sucks the contents of the egg 1 out of the same into said container.

Figure 2:
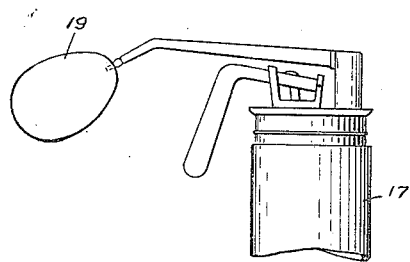
Fig. 2 shows filling an empty egg shell with the solution of gum-arabic and ethyl alcohol.

After the egg 1 has been emptied, the shell 19 thereof is sprayed and partially filled with a solution of gum-arabic and ethyl alcohol. This solution is prepared substantially of one part of gum-arabic dissolved in two parts of ethyl alcohol by volume. A sprayer 17 shown in Fig. 2 may be used for that purpose.

Figure 3:
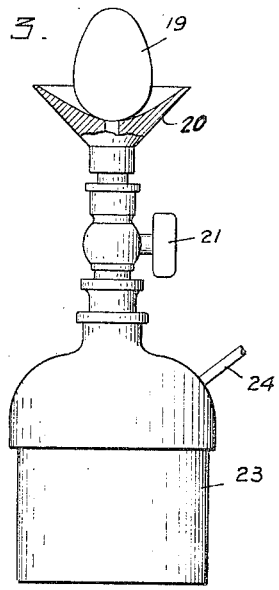
Fig. 3 shows the remnants of the solution of gum-arabic and ethyl alcohol sucked out of the egg shell by vacuum.
Figure 4:
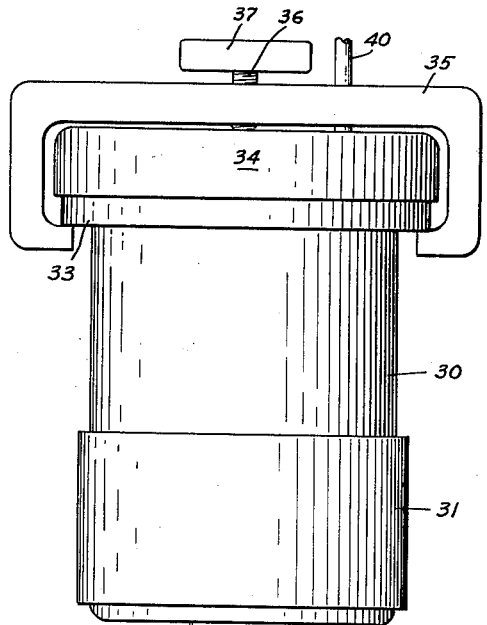
Fig. 4 shows filling of an empty egg shell with chocolate.

The egg shell is vigorously shacked manually or by some mechanical means to assure that all inside surface is covered with said solution. Thereupon the remaining portion of the solution is exhausted by vacuum means, such as shown in Fig. 3. The latter consists of a suction cup 20 operatively connected with a valve 21, which is attached to a container 23. The latter is connected by a pipe 24 to some source of vacuum, not shown in the drawing. The egg shell 19 is placed on the cup 20 and the valve 21 is turned to apply suction thereon. The solution remaining in the egg shell is rapidly exhausted into the container 23. The egg shell 19 is permitted to dry which requires only a few minutes. The dried solution forms a thin film 25 on the inner wall of said shell. Then the egg shell 19 is filled with hot chocolate or other confectionary. Various means may be employed for that purpose, and we have shown in Fig. 4 a pressure container 30 which is filled with hot chocolate. The latter is kept hot in the container 30 by an electric heating collar 31 located on the lower part thereof. The upper part of the container 30 is formed with a ring 33 above which is a closure 34. A bracket 35 is provided over said closure and is anchored under said ring 33. In the middle of said bracket 35 is arranged a pressure bolt 36 having a turn knob 37. By turning the knob 37 the pressure on the closure 34 is increased thus holding the same tight on said container. The pressure of about 50 lbs. is supplied to said container by some source of air pressure such as an air pressure pump, not shown in the drawing, and communicating with said container by means of a pipe 40.

Figure 5:
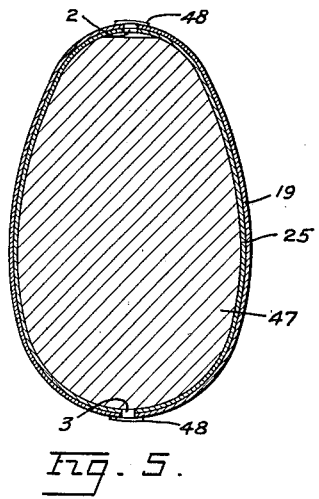
Fig. 5 shows a cross-section of an egg shell filled with chocolate.

The container 30 carries on its bottom an outlet pipe 42 to which is secured a valve 43. A filling nozzle 45 is attached to the latter valve. The nozzle 45 is hollow and terminates with a very fine discharge needle 46 which is introduced through one of the holes 2 and 3 into the egg shell 19. The valve 43 is opened, thus permitting hot chocolate to pass from the container 30 into the egg shell. The shell 19 is filled with chocolate as shown at 47 in Fig. 5, and the holes 2 and 3 are thereupon sealed by some means, such as cellophane 48, scotch tape, or the like.

Figure 6:
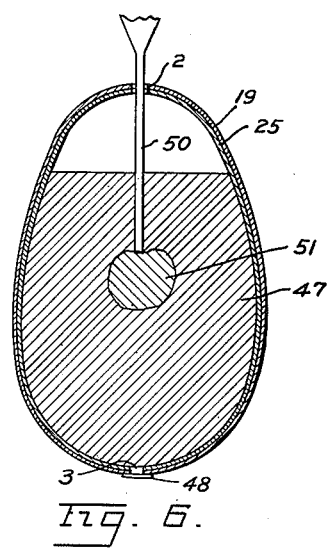
Fig. 6 shows a cross-section of an egg shell partly filled with chocolate being filled with a different confectionary.

If desired, a simulated yoke is created inside of the chocolate egg, as shown in Fig. 6. The egg shell 19 is filled about three quarters of its volume. Thereafter a long hollow needle 50 is introduced into the chocolate, so that its end is substantially in the center of the egg shell 19. Thereupon some confectionary 51, preferably of a different color than that of the chocolate 47, is forced into the shell at a greater pressure than 50 lbs., preferably 100–110 lbs. The confectionary 51 fills the center of the egg shell displacing and forcing chocolate 47 upwardly. When the egg shell is filled, the needle 50 is withdrawn and the holes 2 and 3 are sealed as above said.

The solution of gum-arabic and ethyl alcohol covering the inside of the egg shell in form of the film 25 contributes to the final product in the following manner: it seals the pores in the egg shell; it makes the egg shell considerably tougher and thus affords better protection from accidental cracking of the egg shells; it protects the content of the egg shell from spoiling and consequently the same remains edible for considerably longer period of time; it permits much easier peeling of the egg shell; it makes the surface of the chocolate glossy and even and the peeled chocolate egg looks beautiful and shiny.

We claim:

1. An article of manufacture comprising an egg shell, a film covering the inside surface of said egg shell, said film being made of gum-arabic dissolved in ethyl alcohol, and confectionary filling the inside of said egg shell.

2. The method of filling an egg shell with confectionary comprising: perforating an egg, evacuating the contents thereof, covering the inside surface of the egg shell with a solution of gum-arabic and ethyl alcohol, evacuating the excess of said solution, permitting said solution to dry, and filling said egg shell with confectionary.

3. The method for filling an egg shell with confectionary comprising the following steps: perforating an egg; evacuating the contents of the egg, covering the inside surface of the egg shell with a coating sealing the egg shell pores and filling said egg shell with confectionary.

4. The method for filling an egg shell with confectionary comprising the following steps: forming an opening through each end of the egg shell; evacuating the contents of the egg through one opening while the other opening remains open; coating the inside of the egg shell with a solution of gum-arabic and ethyl alcohol, filling said egg shell with confectionary through one of said openings, and sealing the openings.

5. An article of manufacture comprising an egg shell, a protective coating covering the inner side of said shell and confectionary filling in the inside of said egg shell.

6. The method for filling an egg shell with confectionary comprising the following steps: forming an opening through each end of the egg shell; evacuating the contents of the egg through one opening while the other opening remains open; spraying the inside of the egg shell with a coating sealing the egg shell pores, evacuating the excess of said coating, permitting the solution to dry on the inner wall of said egg shell, and filling said egg shell with confectionary material.

7. The method for filling an egg shell with confectionary comprising the following steps: forming an opening through each end of the egg shell; evacuating the contents of the egg through one opening while the other opening remains open; spraying the inside of the egg shell with a solution of gum-arabic and ethyl alcohol, evacuating the excess of said solution, permitting said solution to dry on the inner wall of said egg shell, and filling said egg shell with confectionary material.

References Cited in the file of this patent

UNITED STATES PATENTS

| | | |
|---|---|---|
| 315,559 | Schwarzschild et al. | Apr. 14, 1885 |
| 1,809,383 | Heyboer | June 9, 1931 |

FOREIGN PATENTS

| | | |
|---|---|---|
| 21,855 | Great Britain | 1893 |
| 100,191 | Australia | Jan. 28, 1937 |